Sept. 29, 1931.  R. F. RUNGE  1,825,365
CAGE FOR BALL BEARINGS
Filed June 12, 1929    2 Sheets-Sheet 1
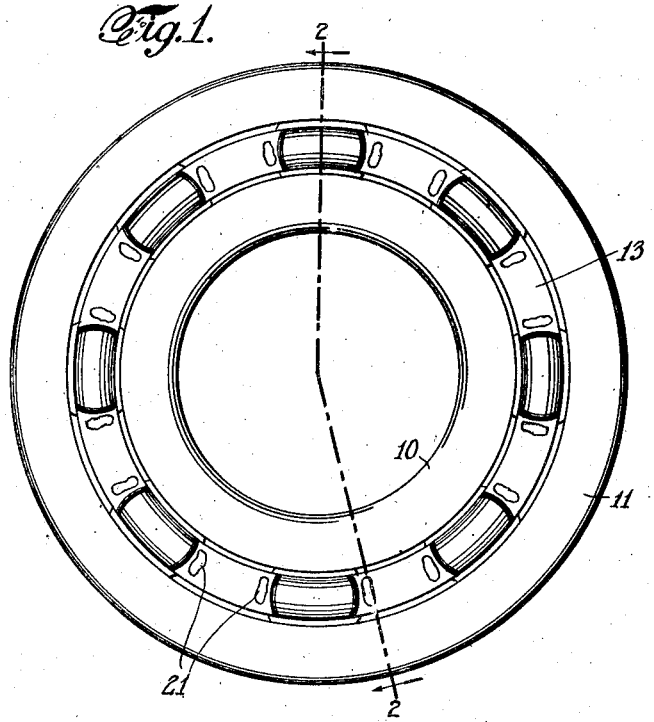
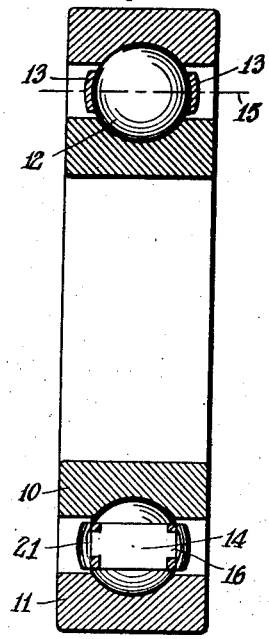
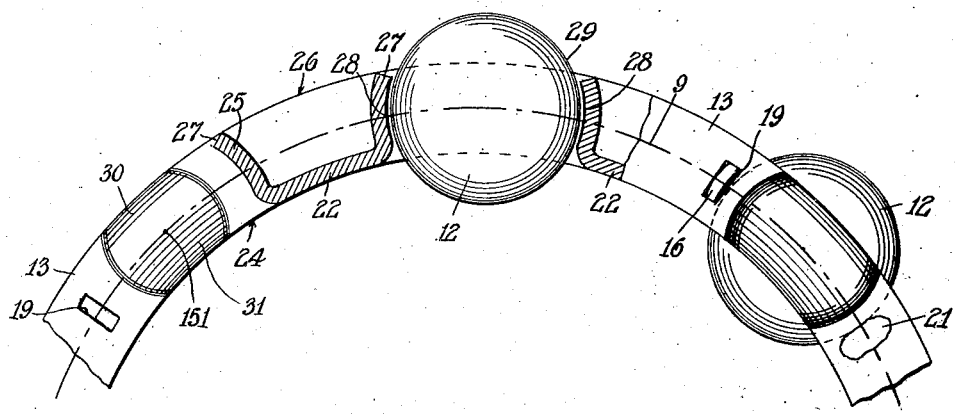
INVENTOR
ROBERT F. RUNGE
BY
ATTORNEY

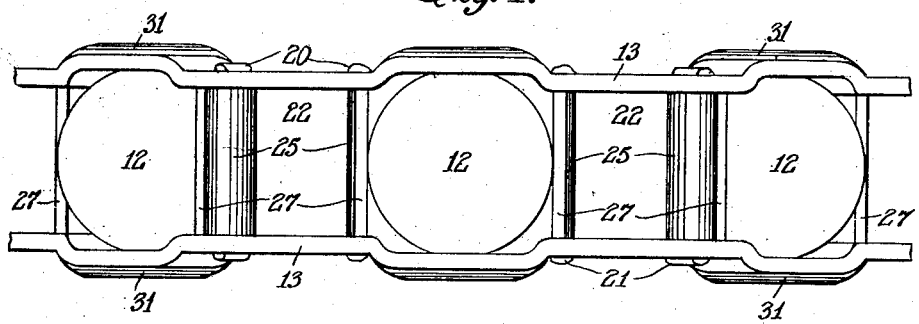
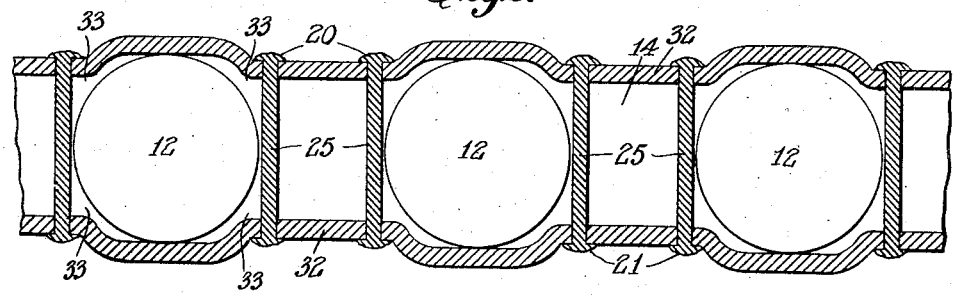
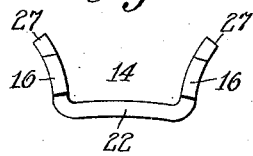
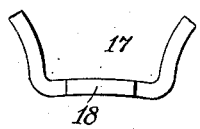
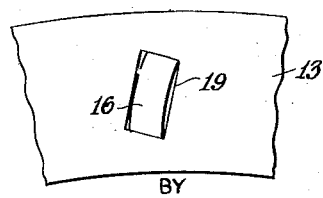

Patented Sept. 29, 1931

1,825,365

UNITED STATES PATENT OFFICE

ROBERT F. RUNGE, OF FOREST HILLS GARDENS, LONG ISLAND, NEW YORK, ASSIGNOR TO THE HESS-BRIGHT MANUFACTURING COMPANY, OF PHILADELPHIA, PENNSYLVANIA, A CORPORATION OF DELAWARE

CAGE FOR BALL BEARINGS

Application filed June 12, 1929. Serial No. 370,246.

One of the principal objects of this invention is to provide a ball separating and retaining cage for use in antifriction bearings in which the separating element is of such shape and so disposed in relation to the ball position that the rolling circumference of the ball engages the separator for forwarding the cage, the contact region on the separator being of sufficient length that slight lateral floating of the cage structure will not affect the proper engagement with the rolling circumference of the ball.

Another object obtained by my cage is that the separating elements may be made of one material such as bronze for receiving the forwarding influence of the balls with a minimum amount of friction, and the side rings or plates may be formed of another and stiffer or more sturdy material, such as steel.

A further object of the invention has for its purpose reducing the lateral movement or float of the cage to a minimum while at the same time permitting a limited but actual amount of circumferential floating of the cage in respect of the balls.

The cage presses the balls at the poles by initial pressure applied in assembling.

The cage is so designed that ample dirt collecting pockets are located at such distances from the points of cage contact with the balls that the dirt which naturally does accumulate in the pockets of cages in general practice will be retained in such positions as to have no abrading or other deteriorating effect whatsoever upon the balls.

A cage made in accordance with my invention is so designed that it has a minimum amount of eccentric throw. Also in my cage there is a minimum amount of drawing. The cage presents the maximum lubrication through the ball contact at the rolling circumference, since centrifugal action causes oil to collect on the rolling circumference, which oil is deposited on the cage at the place where it is engaged by such oil bathed circumference. It is of strong and sturdy construction, but it embodies the necessary flexibility to prevent setting up of weakening bending stresses.

While the cage is adapted to be so carried by the balls that the lateral and eccentric floating are minimized, yet there is no wedging or tendency for the balls to wedge in their pockets.

All of the foregoing characteristics make for durability and economy not only because of the elimination of breakages, but owing to the fact that the design is such that the cages may be commercially manufactured in quantity by efficient and economical processes.

In the drawings accompanying this specification one embodiment of my invention is illustrated, which may be the preferred form, in which drawings Figure 1 is a face view of a deep groove radial bearing equipped with a form of my improved cage.

Fig. 2 is a section taken on a plane at about the line 2—2 of Figure 1.

Fig. 3 is an enlarged detail of the cage in the Figure 1 position showing portions of the cage in elevation, other portions in section, and also illustrating one of the rivets in a rivet hole prior to being headed.

Fig. 4 is a view looking at the cage and the balls, in the direction of looking down the sheet, in Fig. 3.

Fig. 5 is a horizontal development of Fig. 4 on a plane at about the region of the pitch circle in Fig. 3.

Fig. 6 is an end view of one of the separators detached.

Fig. 7 is a similar view showing a modified form of rivet, Fig. 6 showing two rivets in the upstanding or ball engaging portions, and Fig. 7 showing an elongated rivet in the intermediate portion, and Fig. 8 is a detail of the unheaded rivet in the rivet hole.

For convenience of description my invention is illustrated in connection with a deep groove radial bearing of the Conrad type having an inner ring 10 and an outer ring 11 formed with the usual race grooves, and between which rings there is shown a series of balls 12. The particular form of cage illustrated is designed for use in a bearing which is assembled by the Conrad eccentric displacement method and in which the balls are widely spaced apart. The cage is formed of a pair of similar side rings or plates 13, preferably formed of steel, which are held together by a series of separators 14 which are preferably formed of bronze.

At each ball pocket the plates 13 are shaped to closely conform to the ball at and adjacent its rotating axis, the poles or rotating axis being indicated in Fig. 2 by the line 15.

The separators are formed with extensions which will be clenched or riveted over on the sides of the plate 13 after passing through suitable perforations formed therein. In the drawings, from 1 to 6 inclusive, each separator 14 is shown having at each end two rivet members 16. In Fig. 7 the separator 17 is shown as having one rivet member 18 at its end.

By reference to Figs. 6 and 8 and the right-hand end of Fig. 3, it will be seen that the rivet 16 is curved although the rivet hole 19 is rectangular in shape. While this might be regarded as incidental to the manufacture of the separator which has its trough-shaped sides formed on curved lines, yet this shape works to advantage in assembling the cage about the balls after these have been introduced between the rings 10 and 11 of the bearing and preliminarily spaced.

A set of separators 14 is first assembled with one of the rings 13 and the rivets 16 headed over as at 20. These separators are then placed between the balls and the other ring 13 brought in position so that the extending rivets 16 on the free ends of the separators are in position for entering the slots 19 when the other plate 13 is presented to them. The curved formation of these rivets in entering the rectangular openings affords just sufficient free movement to permit easy assembly, but nevertheless accurately positions the parts so that the separators are not sprung out of shape or position during the assembly, nor are they sprung out of shape or position when the rivets are headed over as at 21.

Each of the separators is shown having a portion 22 disposed below the pitch circle represented in Fig. 3 by the curve 9, which portion 22 is also curved to conform with the pitch circle or to conform with the inner edge 24 of the plates 13.

The side members or ball engaging faces 25 are curved to correspond with the great circle of the balls 12, i. e. the separator face is formed on the radius of the ball, and these faces are located in position to engage by line contact the rolling circumference of the ball, the rolling circumference 29 in the illustration in Fig. 3 being represented by the outline of the ball which is shaded for representing a full ball. The sides 25 or ball engaging portions of the cage preferably do not extend beyond or outwardly of the outer edge 26 of the rings 13. Owing to the fact that these separators are stamped up from cut-out or blanked material, the edges 27 of the sides 25 assume a slanting position which, at the point at which the cross-section in Fig. 3 is taken, is disposed radially of the ball 12. This gives a strong and sturdy construction and presents the metal of the separator in its full strength for resisting any tendency of the ball to outward movement.

The main function of the separators is to separate and space the balls apart and to receive the forwarding influence of the balls as these run upon the race grooves of the ball bearing rings. The cage, however, is carried on the balls primarily by the side members 13 which are concave or dished at the ball pockets so as to positively engage the balls at the region of their axes of rotation represented at the left-hand side of Fig. 3 by the dot 151, which represents the position of the axis 15 of the ball when this is centrally disposed between the curved faces 28 of two adjacent separators. It will be noted from the center position of Fig. 3 that there is an appreciable clearance between the rolling circumference 29 of the ball and these faces. This capability of free circumferential floating in a pocket formed at front and rear for line engagement with the rolling circumference of the ball can be accomplished economically only in a built up structure such as pressed sheet metal.

In operation sometimes the ball will engage the face at the forward side of its running circumference, and sometimes at the rearward side, and sometimes it will be free of both faces. This movement is very slight but nevertheless sufficient for accomplishing the purpose of permitting a free circumferential floating of the cage which facilitates lubrication, prevents wedging and binding, and materially adds to the life span of the cage.

The lines 30 in Fig. 3 are intended to represent the concavity 31 of the rings 13 where these engage the poles of the ball. The lines for an appreciable distance forwardly and backwardly of the ball engaging position are disposed concentric with the pitch circle throughout at least the range of traverse of the polar regions of the ball during the free forward and backward or circumferential movement. The walls which these lines represent are concentric for a sufficient distance to permit the ball to move against either of the faces 28, even assuming that in times of great stress or shock loads the ball presses the portion 25 of the separator a sufficient amount to appreciably deflect it from its normal position. These walls of the pair of side rings 13 are parallel and sufficiently close together to reduce the lateral movement or float of the cage to a minimum.

In the preferred form of the invention illustrated in the drawings the rings or side plates 13 are preferably formed flat at the regions 32 between the ball pockets and are preferably flat sufficiently for each side of the rivet holes to afford a solid and uniform base for the separating pieces and for heading over of the rivets 16.

Another object of the curving or bending inwardly of the side plates between the pockets is to permit the use of shorter separators and also to bring the heads of the rivets well within the side lines of the major portions of the cage. The pocket forming portions 31 of the cage will thus be seen to extend outwardly beyond the rivet between heads 20 and 21, thereby presenting a smooth surface of metal which is pleasing to the eye and is safe in operation.

Whatever pockets are formed in which foreign matter will collect, are located at a great distance from the ball, and in no instance at the places where the balls engage the cage structure. There are pockets formed at 33 which are specially designed for collecting whatever foreign matter may be entrained in the lubricant, and for holding it at a safe distance from the balls and at a safe distance from those places on the cage which engage the balls.

It is a fact well known to users of ball bearings and to ball bearing manufacturers and to those who supply lubricant to the manufacturers and the users, that foreign matter does find access not only to ball bearings while they are in use, but also it is very apt to be present on the surface of the balls or the race grooves or in the lubricant at the time the bearings are first installed in the positions where they are to be used. The presence of this foreign matter which is generally of an abrasive character, causes friction, heating and wear of the parts, oftentimes destructive wear. Abrasive and other foreign matter causes the bearings to be noisy. This presence of foreign matter causes many disputes between the manufacturer and the ultimate consumers of the bearings, and frequently between the consumer of the bearing and the lubricant manufacturer.

In designing this bearing I have frankly recognized the fact that foreign matter is frequently inside a bearing when the machine in which it is mounted is ready to be run. And being well aware of such presence of foreign matter, I have provided for its ready disposal by affording large pocket space at points where the foreign matter may collect without detriment to the bearing or interference with its free and copious lubrication.

The receptive capacity of the collecting pockets is far in excess of the amount of foreign matter which will normally get into a bearing during a very long period of use and abuse. If it is fed in much larger quantities than can be readily accommodated by the collection pockets afforded in this cage, of course it will have a wearing effect on the parts to such an extent that it will cause the premature failure of some of the parts and destruction of the bearing.

The large open spaces about the balls facilitate cleaning the cage either of old lubricant or of accumulated foreign matter, as they permit easy flushing with oil or other cleansing fluid.

The foregoing description while relating in some portions specifically to the illustrative example of my invention shown in the drawings, is for the purpose of explaining in detail the design which I now regard as the preferred form, yet it will be apparent that changes may be made within the scope of the claims without departing from the spirit of my invention.

Having thus described my invention, I claim and desire to secure by Letters Patent:

1. A circumferentially floating ball bearing cage comprising a pair of side rings and ball separators carried by the side rings at equally spaced distances, affording ball pockets between the side rings at the spaces between adjacent separators, the separators being so positioned in relation to each pocket as to permit a minute relative free forward and backward movement of a ball therein, the side rings being concave and parallel at the ball pockets throughout at least the range of traverse of the polar regions of the ball during the aforesaid free relative forward and backward movement.

2. A circumferentially floating ball bearing cage comprising a pair of side rings and ball separators carried by the side rings at equally spaced distances, affording ball pockets between the rings at the spaces between adjacent separators, the separators being so positioned in relation to each pocket as to permit a minute relative free forward and backward movement of a ball therein along the line of the pitch circle, the walls of the side rings being concave and parallel at the ball pockets and presenting surfaces disposed concentric with the pitch circle throughout at least the range of traverse of the polar regions of the ball during the aforesaid free relative forward and backward movement and sufficiently close together to confine the balls laterally.

3. A circumferentially floating ball bearing cage comprising a pair of side rings and ball separators carried by the side rings at equally spaced distances, affording ball pockets between the rings at the spaces between adjacent separators, the separators being so positioned in relation to each pocket as to permit a minute relative free forward and backward movement of a ball therein along the line of the pitch circle, the side rings being adapted for engaging the balls at and adjacent their poles throughout the entire range of relative forward and backward movement for confining the balls laterally.

4. A circumferentially floating ball bearing cage comprising a pair of side rings and ball separators carried by the side rings at equally spaced distances, affording ball pockets between the side rings at the spaces between adjacent separators, the side rings being constructed and adapted to engage the balls at and adjacent their poles throughout a limited range of relative forward and backward movement for confining the balls laterally.

5. The combination with ball bearing race rings and a set of cooperative balls, of a pair of cage side plates, separators carried by the side plates at equally spaced distances affording ball pockets between the side rings at the spaces between adjacent separators, the separators being so positioned in relation to each pocket and the ball within it as to confine the ball laterally and permit a minute relative free forward and backward movement of the ball therein, the side rings being concave at the ball pockets throughout at least the range of traverse of the polar regions of the ball during the aforesaid free relative movement.

6. The combination with ball bearing race rings and a set of cooperative balls, of a pair of cage side plates, separators carried by the side plates at equally spaced distances affording ball pockets between the side rings at the spaces between adjacent separators, the separators being so positioned in relation to each pocket and the ball within it as to confine the ball laterally and permit a minute relative free forward and backward movement of the ball therein along the line of the pitch circle, the side rings being concave at the ball pockets and presenting faces disposed concentric with the pitch circle throughout at least the range of traverse of the polar regions of the ball during the aforesaid free relative movement.

7. The combination with ball bearing race rings and a set of cooperative balls, of a pair of cage side plates, separators carried by the side plates at equally spaced distances affording ball pockets between the side rings at the spaces between adjacent separators, the separators being so positioned in relation to each pocket and the ball within it as to confine the ball laterally and permit a minute relative free forward and backward movement of the ball therein along the line of the pitch circle, the side rings engaging the balls at and adjacent their poles throughout the entire range of relative forward and backward movement.

8. The combination with ball bearing race rings and a set of cooperative balls, of a pair of cage side plates, separators carried by the side plates at equally spaced distances affording ball pockets between the side rings at the spaces between adjacent separators, the side rings being constructed and adapted to engage the balls at and adjacent their poles throughout a limited range of relative forward and backward movement for confining the balls laterally.

9. In a ball bearing cage, the combination with a pair of side rings, of a number of ball separators carried by the side rings at equally spaced distances, affording ball pockets between the side rings at the spaces between adjacent separators, the separators having segmental cylindrical surfaces extending from side ring to side ring and conforming to the circumference of a ball therein at the region located in position for ball engagement, and the separators being so positioned in relation to each pocket as to permit a minute relative free forward and backward movement of a ball therein throughout at least the range of traverse of the polar regions of the ball during the aforesaid free relative movement.

10. In a ball bearing cage, the combination with a pair of side rings, of a number of ball separators carried by the side rings at equally spaced distances, affording ball pockets between the rings at the spaces between adjacent separators, the separators having segmental cylindrical surfaces extending from side ring to side ring and conforming to the circumference of a ball therein at the region located in position for ball engagement, the side rings being concavo-convex at the ball pockets and substantially flat between the pockets.

11. A circumferentially floating ball bearing cage comprising a pair of side rings and ball separators carried by the side rings at equally spaced distances, affording ball pockets between the rings at the spaces between adjacent separators, the separators having segmental cylindrical surfaces extending from side ring to side ring and conforming to the circumference of a ball therein at the region located in position for ball engagement, and the separators being so positioned in relation to each pocket as to permit a minute relative free forward and backward movement of the ball therein along the line of the pitch circle, the side rings being adapted for engaging the balls at and adjacent their poles throughout the entire range of relative forward and backward movement for confining the balls laterally.

12. A circumferentially floating ball bearing cage comprising a pair of side rings and ball separators carried by the side rings at equally spaced distances, affording ball pockets between the side rings at the spaces between adjacent separators, the side rings being constructed and adapted to engage the balls at and adjacent their poles throughout a limited range of relative forward and backward movement for confining the balls laterally, and the separators being adapted to engage the balls on their rolling circumferences.

13. The combination with ball bearing race rings and a set of cooperative balls, of a pair of cage side plates, separators carried by the side plates at equally spaced distances affording ball pockets between the side rings at the spaces between adjacent separators, the separators being so positioned in relation to each pocket as to permit a minute relative free forward and backward movement of the ball therein, the separators being cylindrical at the ball engaging portions for engaging the balls on their rolling circumferences normally and during periods of lateral maladjustment of the side rings.

14. The combination with ball bearing race rings and a set of cooperative balls, of a pair of cage side plates adapted to confine the balls laterally, separators carried by the side plates at equally spaced distances affording ball pockets between the side rings at the spaces between adjacent separators, the separators being so positioned in relation to each pocket as to permit limited free circumferential floating of the cage relative to the balls.

15. The combination with ball bearing race rings and a set of cooperative balls, of a pair of cage side plates adapted to confine the balls laterally, separators carried by the side plates at equally spaced distances affording ball pockets between the side rings at the spaces between adjacent separators, the separators having segmental cylindrical faces for engaging the balls on their rolling circumferences and being so positioned in relation to each ball as to permit a minute relative free lateral movement and relative free forward and backward movement of the separator in respect of the ball therein.

16. The combination with ball bearing race rings and a set of cooperative balls, of a pair of cage side plates, separators carried by the side plates at equally spaced distances affording ball pockets between the side rings at the spaces between adjacent separators, the side rings being constructed and adapted to engage the balls at and adjacent their poles for confining the balls laterally throughout a limited range of free circumferential floating of the cage on the balls.

17. In a ball bearing cage, the combination with a pair of side rings formed of stiff sturdy metal, of a number of ball separators formed of milder metal and carried by the side rings at equally spaced distances, affording ball pockets between the side rings at the spaces between adjacent separators.

18. In a ball bearing cage, the combination with a pair of side rings formed of stiff sturdy metal, of a number of ball separators formed of milder metal and carried by the side rings at equally spaced distances, affording ball pockets between the side rings at the spaces between adjacent separators, the separators having segmental cylindrical surfaces extending from side ring to side ring and conforming to the circumference of a ball therein at the region located in position for ball engagement, and the separators being so positioned in relation to each pocket as to permit a minute relative free forward and backward movement of a ball therein throughout at least the range of traverse of the polar regions of the ball during the aforesaid free relative movement.

19. The combination with ball bearing race rings and a set of cooperative balls, of a pair of cage side plates, separators carried by the side plates at equally spaced distances affording ball pockets between the side rings at the spaces between adjacent separators, the side rings being constructed and adapted to engage the balls at and adjacent their poles throughout a limited range of relative forward and backward movement, the juncture of the separators and side plates within each pocket being remote from positions which can be occupied by the ball therein and affording dirt collecting pockets.

20. In a ball bearing cage, the combination with a pair of side rings, of a number of ball separators carried by the side rings at equally spaced distances, affording ball pockets between the rings at the spaces between adjacent separators, the side rings being concavo-convex at the ball pockets and substantially flat at the region of juncture with the separators whereby dirt collecting pockets are afforded at places remote from the ball positions.

21. In a ball bearing cage, the combination with a pair of side rings, of a number of ball separators carried by the side rings at equally spaced distances, affording ball pockets between the rings at the spaces between adjacent separators, the separators having segmental cylindrical surfaces extending from side ring to side ring and conforming to the circumference of a ball therein at the region located in position for ball engagement, the side rings being concavo-convex at the ball pockets and substantially flat at the region of juncture with the separators whereby square cornered dirt collecting pockets are afforded at places remote from the ball positions.

22. A circumferentially floating ball bearing cage comprising a pair of side rings and ball separators carried by the side rings at equally spaced distances, affording ball pockets between the rings at the spaces between adjacent separators, the separators having segmental cylindrical surfaces extending from side ring to side ring and conforming to the circumference of a ball therein at the region located in position for ball engagement, and the separators being so positioned in relation to each pocket as to permit a minute relative free forward and backward movement of the ball therein along the line of the pitch circle, the side rings being adapted for engaging the balls at and adjacent their poles throughout the entire range of relative forward and backward movement; at the region of juncture with the separators there being formed dirt collecting pockets at places remote from any position the ball can assume when floating under load.

23. The combination with ball bearing race rings and a set of cooperative balls, of a pair of cage side plates formed of steel, separators formed of bronze and carried by the side plates at equally spaced distances affording ball pockets between the side rings at the spaces between adjacent separators, the separators being so positioned in relation to each pocket as to permit limited free circumferential floating of the cage relative to the balls.

24. A circumferentially floating ball bearing cage comprising a pair of side rings formed of steel and ball separators formed of bronze and carried by the side rings at equally spaced distances, affording ball pockets between the side rings at the spaces between adjacent separators, the side rings being constructed and adapted to engage the balls at and adjacent their poles throughout a limited range of relative forward and backward movement, and the separators being adapted to engage the balls on their rolling circumferences for confining the balls laterally.

25. The combination with ball bearing race rings and a set of cooperative balls, of a pair of cage side plates formed of steel, separators formed of bronze and carried by the side plates at equally spaced distances affording ball pockets between the side rings at the spaces between adjacent separators, the separators being so positioned in relation to each pocket as to permit a minute relative free forward and backward movement of the ball therein, the separators being cylindrical at the ball engaging portions for engaging the balls on their rolling circumference normally and during periods of lateral maladjustment of the side rings, at the region of juncture with the separators there being formed square cornered dirt collecting pockets at places remote from the ball positions.

26. The combination with ball bearing race rings and a set of cooperative balls, of a pair of cage side plates, separators formed of bronze and carried by the side plates at equally spaced distances affording ball pockets between the side rings at the spaces between adjacent separators, the side rings being formed of stiffer and more sturdy material and being constructed and adapted to engage the balls at and adjacent their poles through- out a limited range of free circumferential floating of the cage on the balls.

Signed at New York, N. Y., this 11th day of June, 1929.

ROBERT F. RUNGE.